(12) United States Patent
Kim et al.

(10) Patent No.: US 6,556,038 B2
(45) Date of Patent: Apr. 29, 2003

(54) IMPEDANCE UPDATING APPARATUS OF TERMINATION CIRCUIT AND IMPEDANCE UPDATING METHOD THEREOF

(75) Inventors: Nam-Seog Kim, Seoul (KR); Uk-Rae Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/933,068

(22) Filed: Aug. 20, 2001

(65) Prior Publication Data

US 2002/0118037 A1 Aug. 29, 2002

(30) Foreign Application Priority Data

Feb. 5, 2001 (KR) .......................................... 2001-5340

(51) Int. Cl.$^7$ ............................................. H03K 17/16
(52) U.S. Cl. .............................. 326/30; 326/86; 326/95; 327/108
(58) Field of Search ............................. 326/30, 86, 95, 326/98; 327/108

(56) References Cited

U.S. PATENT DOCUMENTS 5,134,311 A * 7/1992 Biber et al. .................. 307/270
5,955,894 A * 9/1999 Vishwanthaiah et al. ..... 326/86

* cited by examiner

Primary Examiner—Michael Tokar
Assistant Examiner—Daniel D. Chang
(74) Attorney, Agent, or Firm—F. Chau & Associates, LLP

(57) ABSTRACT

An impedance updating apparatus includes a terminator circuit for receiving and terminating an external input signal, the terminator circuit having an up-terminator and a down-terminator; and an update controller for separately controlling the up-terminator and the down-terminator based on the level of the external input signal. The update controller includes at least one latch for latching impedance codes of a programmable impedance controller, the impedance codes being used for controlling transistors in the up-terminator and down-terminator. The update controller performs updating impedance of the up-terminator, or down-terminator when an up-update enable signal or a down-update enable signal and a level of the external input signal correspond to a predetermined condition. And the update controller performs updating impedance of the up-terminator, or down-terminator in response to a level of the external input signal during set-up or hold time only. An impedance updating method of termination circuit having up/down terminators and a separate update controller for detecting terminator through which minimum current flows in response to level of an external input signal is also provided which includes the steps of: determining signal levels of an external input signal to thereby detect a terminator through which minimum current flows between the up or down terminator; and impedance updating the detected terminator through which minimum current flows.

14 Claims, 9 Drawing Sheets

IMPEDANCE UPDATING APPARATUS OF TERMINATION CIRCUIT AND IMPEDANCE UPDATING METHOD THEREOF

BACKGROUND OF THE INVENTION

1. Field of the Invention

The present invention relates to an integrated circuit apparatus, and more particularly to an impedance updating apparatus for a termination circuit.

2. Description of the Related Art

As speed of data transmission in and through data transmission systems increases, on-chip termination is required in integrated circuits of the system. FIG. 1 shows a conventional termination circuit for transmitting data in high speed. As shown, an output driver 1 is coupled to a-termination circuit 3 through a data line 2. If the termination circuit 3 as a receiver is connected to parallel termination through the data line 2 when the output driver 1 is a source termination, data in full swing can be transmitted and received, but the swing is reduced at the terminator circuit.

The termination circuit 3 includes transistors which behave as parallel impedance. Since in a memory device, a clock signal, an address signal, and a control signal are transmitted in a single direction, the termination circuit 3 should be continuously turned-on during chip operation. The characteristic impedance of the terminator circuit 3 may vary with variations in process parameters such as process, voltage and temperature (hereinafter referred to as PVT variation). For proper signal termination, the characteristic impedance of the termination circuit 3 should be kept constant.

Referring to FIG. 2a, which is a waveform illustrating an operation of a termination circuit in an on-transition state. The transistors in the terminator circuit are turned on during region 'a' and region 'b', which are indicated with a logic symbol '111111', wherein the 'high' signal is instantaneously bounced up and the 'low' signal is instantaneously bounced down during transition as shown in 'e' and 'f' of FIG. 3a, respectively. Then the bounced signal is again reflected into the output driver 1 (such as a transmitter circuit) in FIG. 1 and causes signal distortion.

Referring to FIG. 2b, which is a waveform illustrating an operation of a termination circuit in an off-transition state. If all the transistors are turned off as shown in 'C' in the region 'c' or 'D' in the region 'd' which are indicated as logic symbol '00000', since the termination circuit is instantaneously in a very low state of impedance, the 'high' signal is instantaneously bounced down or the 'low' signal is instantaneously bounced up during transition as shown in 'g' and 'h' of FIG. 3b, respectively. Then the bounced signal is again reflected into the output driver 1 (such as a transmitter circuit) in FIG. 1 and causes signal distortion.

Accordingly, a problem of the conventional termination circuit is system noise created due to the repeated on/off operations of the transistors, resulting from tracking and updating operations in response to variations in operation environment of chips or an internal PVT.

SUMMARY OF THE INVENTION

An impedance updating apparatus is provided which comprises: a terminator circuit for receiving and terminating an external input signal, the terminator circuit having an up-terminator and a down-terminator; and an update controller for separately controlling the up-terminator and the down-terminator based on the level of the external input signal.

According to an aspect of the invention, the update controller includes at least one latch for latching impedance codes of a programmable impedance controller, the impedance codes being used for controlling transistors in the up-terminator and down-terminator. The update controller performs updating impedance of the up-terminator, or down-terminator when an up-update enable signal or a down-update enable signal and a level of the external input signal correspond to a predetermined condition. And the update controller performs updating impedance of the up-terminator, or down-terminator in response to a level of the external input signal during set-up or hold time only.

An impedance updating termination circuit is provided which comprises: separate update controllers having a first inverter and a second inverter receiving an external input signal, a first latch connected to an output of the first inverter to store impedance information from a programmable impedance up controller, and a second latch connected to an output of the second inverter to store impedance information from a programmable impedance down controller, wherein the separate controller output an impedance update control signal of an up-terminator when the external input signal is a logic "high", and output an impedance update control signal of an down-terminator when the external input signal is a logic "low"; and a terminator circuit having an up-terminator and a down-terminator connected to a common external input signal, wherein the terminator circuit receives impedance information from the first latch to update impedance of the up-terminator when a control signal for controlling an impedance update of the up-terminator is input from the separate update controller, and receives impedance information from the second latch to update impedance of the down-terminator when a control signal for controlling an impedance update of the down-terminator is input from the separate update controller.

The separate update controller further includes: a first NAND gate which receives at a first input the output of the first inverter and at a second input an up-update enable signal, the output of the first NAND gate being connected to the first latch; and a second NAND gate which receives at a first input the output of the second inverter and at a second input an up-update enable signal, the output of the second NAND gate being connected to the second latch, wherein the update controller generates a control signal for controlling up-update or down-update only when the level of the external input signal and the up-update enable signal or down-update enable signal are NANDed.

An impedance updating termination circuit is provided which comprises: a receiver circuit to receive an external input signal; a separate update controller having: an inverter connected to a second latch; an input buffer connected to an output of the receiver circuit at its input and to an internal clock signal determining set-up time or hold time, and the output of the buffer connected to a first latch at its out put and connected to the inverter at its output; a first latch for storing impedance information from a programmable impedance up controller; and the second latch for storing impedance information from a programmable impedance down controller, wherein the separate controller generates an up-update or down-update control signal in response to an up level or down level of an external input signal that passed through the receiver circuit to thereby control separately an up- or down-update of impedance; and a terminator circuit having an up-terminator and a down-terminator connected to a common external input signal from the transmitter circuit, wherein the terminator circuit receives impedance information from the first latch to update impedance of the up-terminator when a control signal for controlling an impedance update of the up-terminator is input from the separate update controller, and receives impedance information from the second latch to update impedance of the down-terminator when a control signal for controlling an impedance update of the down-terminator is input from the separate update controller.

The separate update controller further comprises: a first NAND gate connected to the output of the input buffer at its input and to an up-update enable signal that is periodically generated at its other input and connected to the first latch at its output; and a second NAND gate connected to the output of the input buffer at its input and an down-update enable signal being generated periodically at its other input and connected to the second latch at its output, wherein the update controller generates a control signal for controlling up-update or down-update when the level of the external input signal and the up-update enable signal or down-update enable signal are NANDed or ANDed.

An impedance updating method of termination circuit having up/down terminators and a separate update controller for detecting terminator through which minimum current flows in response to level of an external input signal is also provided which comprises the steps of: determining signal levels of an external input signal to thereby detect a terminator through which minimum current flows between the up or down terminator; and impedance updating the detected terminator through which minimum current flows.

According to the aspect of the invention, the step of determining is performed during set-up time or hold time and the step of determining is performed when a periodic update enable signal is present.

BRIEF DESCRIPTION OF THE DRAWINGS

A better understanding of the present invention can be obtained when the following detailed description of preferred embodiments is considered in conjunction with the following drawings, in which;

FIG. 3a is a waveform illustrating a glitch signal in an on-transition state of the termination circuit like FIG. 2a;

DETAILED DESCRIPTION OF THE INVENTION

Figure 1:
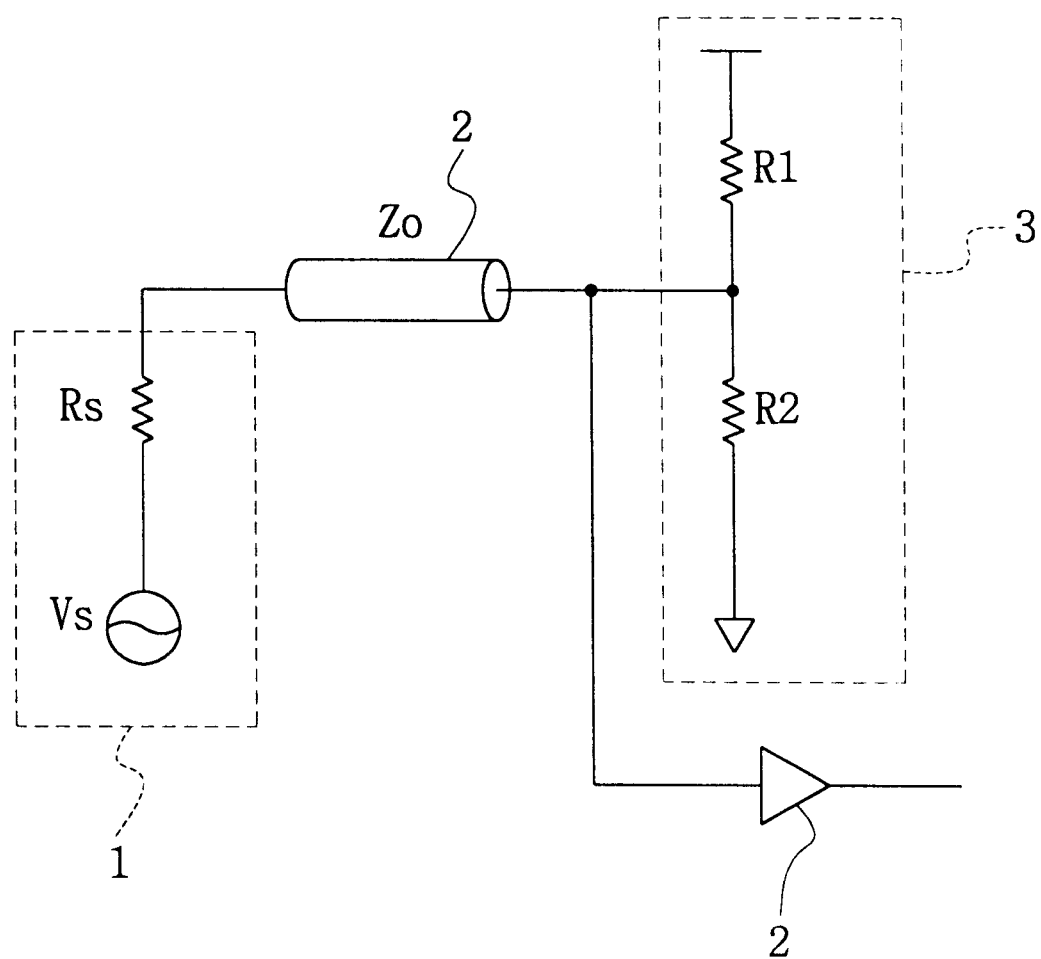
FIG. 1 shows a termination circuit for transmitting high speed data according to the prior art.
Figure 2A:
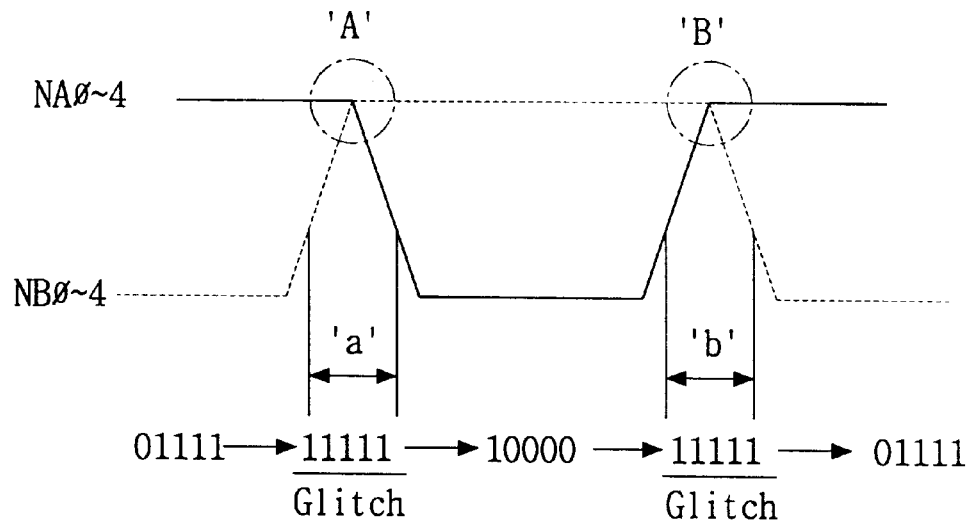
FIG. 2a is a waveform illustrating an operation of a termination circuit in an on-transition state.
Figure 2B:
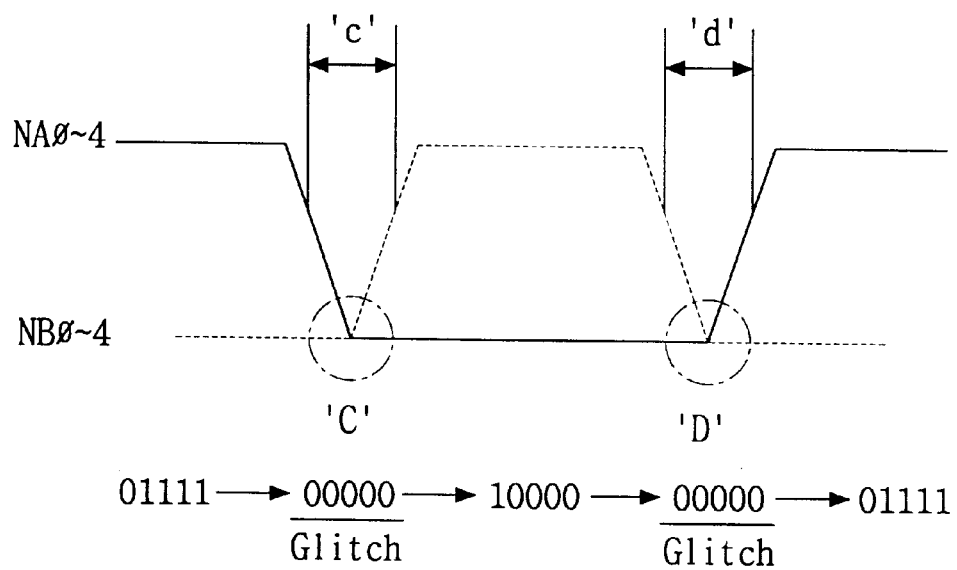
FIG. 2b is a waveform illustrating an operation of a termination circuit in an off-transition state.
Figure 3A:
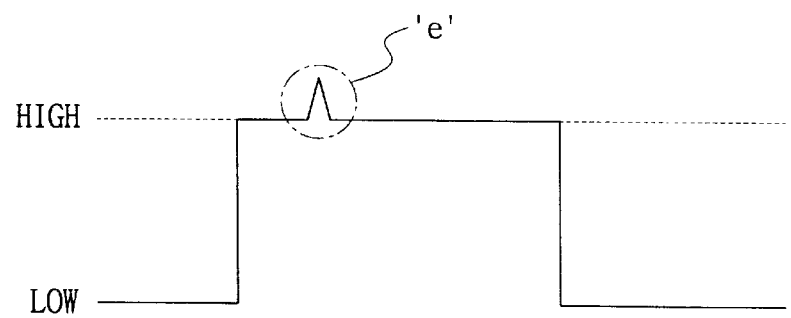
Figure 3A:
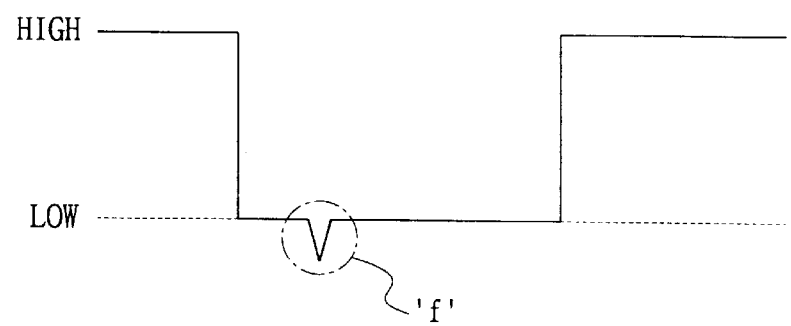
Figure 3B:
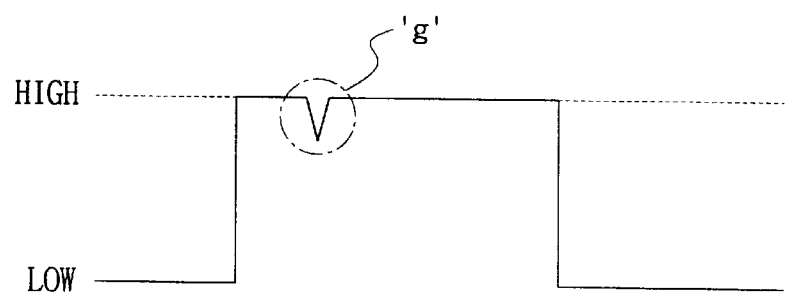
FIG. 3b is a waveform illustrating a glitch signal in an off-transition state of the termination circuit like FIG. 2b.
Figure 3B:
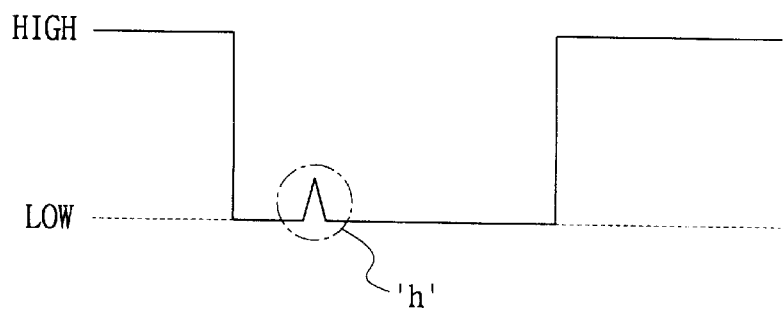

The present invention will be described more fully hereinafter with reference to the accompanying drawings, in which preferred embodiments of the invention are shown. This invention may, however, be embodied in many different forms and should not be construed as limited to the embodiments set for the herein; rather, these embodiments are provided so that this disclosure will be thorough and complete, and will fully convey the scope of the invention to those skilled in the art. In the drawings, the same reference numerals in a different drawings present the same element. Moreover, each embodiment described and illustrated herein includes its complementary conductivity type embodiment as well.

Figure 4A:
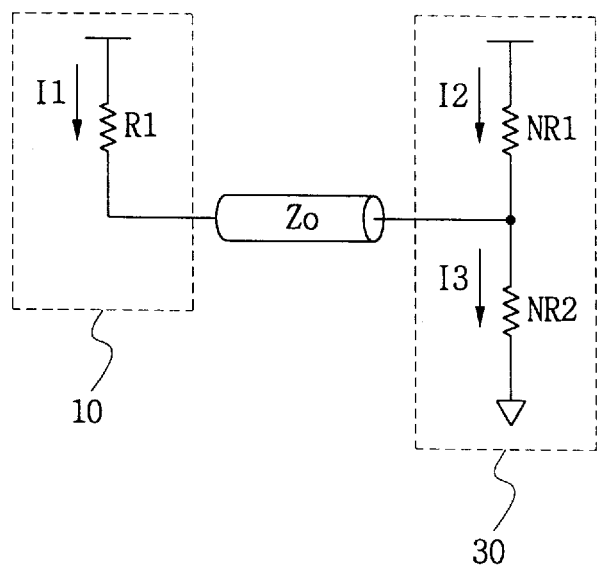
FIGS. 4a and 4b are schematic views illustrating concept for separately updating impedance.
Figure 4B:
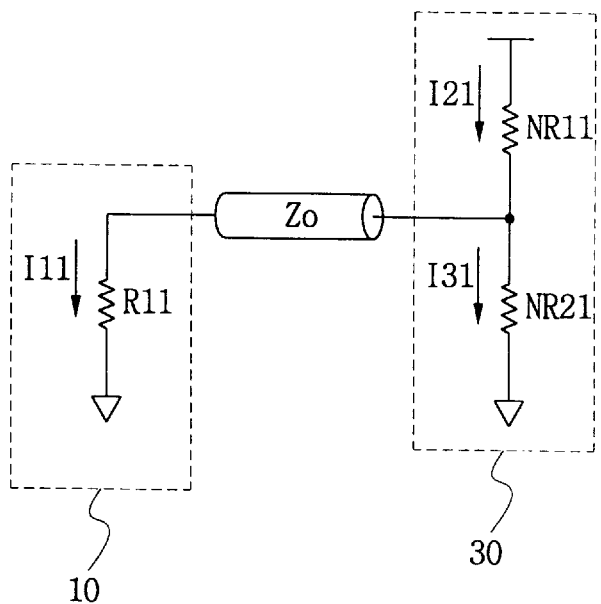

Referring to FIGS. 4a and 4b, which are schematic circuits for separately updating impedance. Referring to FIG. 4a, when the transmitter 10 outputs the signal 'high', the current 13 that flows in the resistance NR2 of the down side of the termination circuit 30 is largest, the current 11 that flows in the resistance RI of the transmitter 10 is middle, and the current 12 that flows in the resistance NR1 in the up side of the termination circuit 30 is smallest. The symbol 'N' indicates a real number more than 1. If the termination impedance of the up driver side has minimum current flow, the signal distortion can be accordingly minimized.

In contrast, referring to FIG. 4b, when the transmitter 10 outputs a signal 'low', the current I21 that flows in the resistance NR11 of the up driver side of the termination circuit 30 is largest, the current I11 that flows in the resistance R11 of the transmitter 10 is middle, and the current 131 that flows in the resistance NR21 of the down driver side of the termination circuit 30 is smallest. The symbol 'N' means a real number more than 1. If the termination impedance of the down driver side has minimum current flow, the signal distortion can be also minimized.

Accordingly, if the impedance is updated differently for the up-terminator and down-terminator, the system noise is minimized.

That is, according to the present invention, while updating impedance separately for each of the up driver side and the down driver side, the driver in which minimum current flows can be detected by using an external signal. Then, impedance of the driver side in which minimum current flows is controlled during updating of impedance, thereby minimizing signal distortion and system noise.

Figure 5:
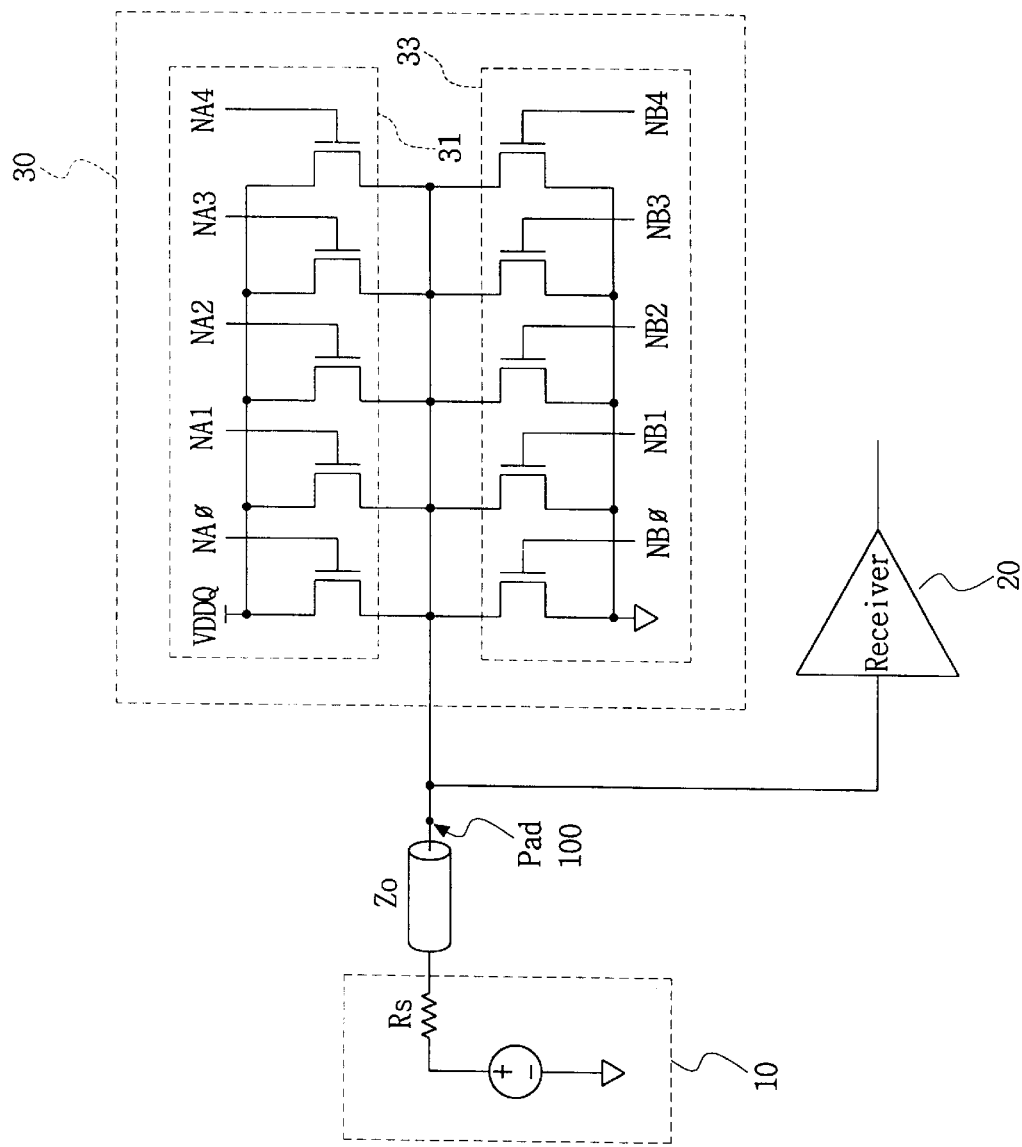
FIG. 5 is a schematic view showing a termination circuit according to the present invention.

FIG. 5 is a schematic view of a termination circuit according to the present invention. Referring to FIG. 5, which is a preferred embodiment of the invention, the termination circuit 30 is divided into an up-terminator 31, which comprises a plurality of transistors controlled by control signals NAφ to NA4. A down-terminator 33 comprises a plurality of transistors controllable by control signal NBφ to NB4. The operations and controls of the up-terminators and down-terminators will be operate from description of the circuits and drawings below. The up-terminators and down-terminators are controled to minimize the system noise, and the up-terminator 31 and the down-terminator 33 are driven separately.

According to a preferred embodiment of the present invention, up-update control signals (e.g., NAφ to NA4) or down-update control signals (e.g., NBφ to NB4) are continuously generated in response to level of the external input signal at a setup time while impedance code created in a programmable impedance controller is held.

Figure 6:
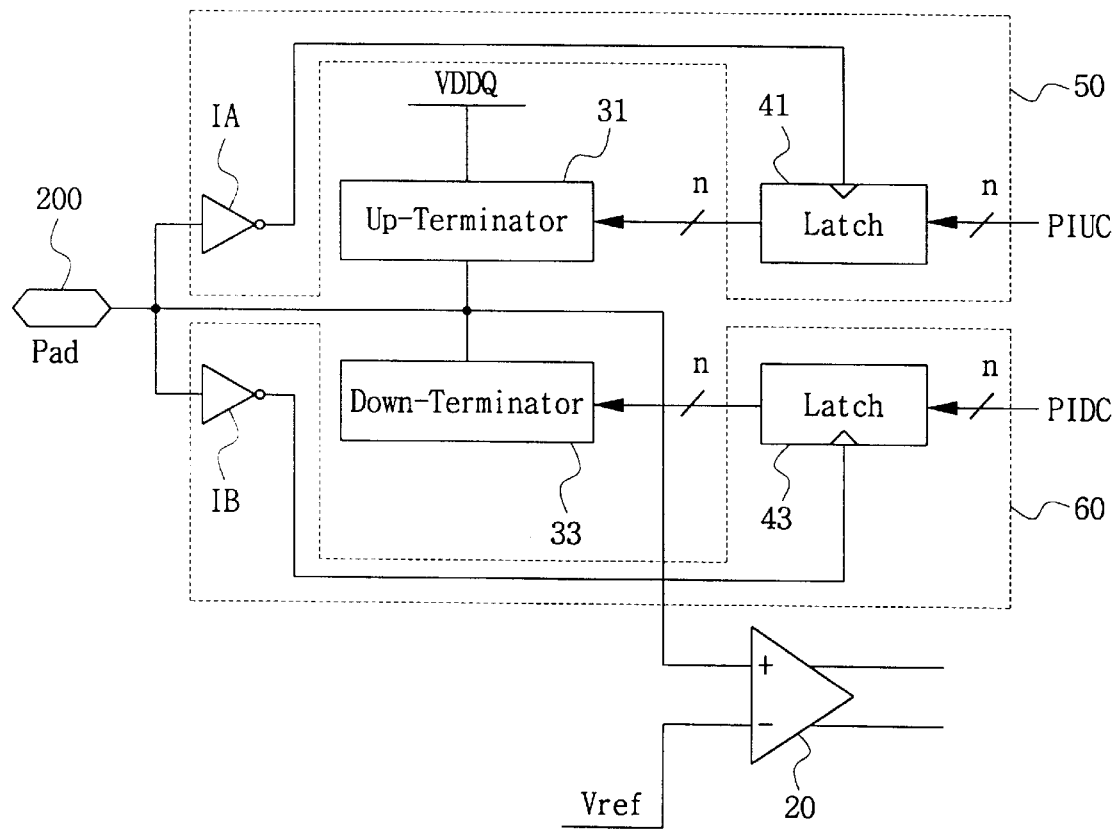
FIG. 6 is a schematic view showing an impedance updating apparatus having termination circuit in relation to separate levels of input signals according to an embodiment of the present invention.

Referring to FIG. 6, which shows an impedance updating apparatus of termination circuit in relation to levels of input signals according to a preferred embodiment of the present invention. Pad 200 corresponds to the pad 100 shown in the output of the transmitter circuit 10 in FIG. 5. The output of the pad is connected to the up-terminator 31, down-terminator 33, receiver 20, an inverter IA and an inverter IB. The up-terminator 31 is connected to a voltage source VDDQ. And the up-terminator 31 is connected to the latch 41 that stores impedance information from the programmable impedance up controller PIUC. The down-terminator 33 is connected to the latch 43 that stores impedance information from the programmable impedance down-controller PIDC. The inverters IA and IB are connected to the latches 41 and 43, respectively. The receiver 20 is a comparator and is connected to a reference voltage Vref. Here, an up-update controller 50 includes the inverter IA and the latch 41. An down-update controller 60 includes the inverter IB and the latch 43. The up-update controller 50 and the down-update controller 60 are called a separate update controller, respectively.

The impedance update apparatus of termination circuit with level of input signals in FIG. 6 operates as follows. The updated impedance information at a predetermined cycle is sent to programmable impedance controller PIUC or PIDC, the updated information is stored in the latch 41 or the latch 43, respectively, then impedance of the up-terminator 31 or down-terminator 33 is updated by the latches 41 and 43 in response to levels of external input signals.

Figure 7:
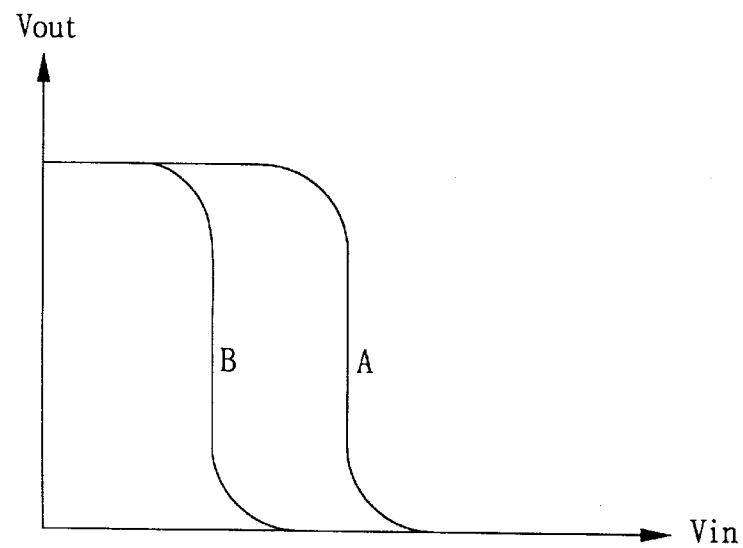
FIG. 7 is a graph illustrating characteristics of the inverter as shown in FIG. 6.

At this time, the characteristics of the inverters IA and IB connected to the pad 200 are shown in FIG. 7. When the external input signal reaches a logic 'high', the inverter IA outputs impedance information to the up-terminator 31 to cause minimum current flow. In contrast, when the external input signal sufficiently reaches a logic 'low', the inverter IB outputs impedance information to the down-terminator 33 in which minimum current flows. Thus, the up-update or down-update is separately controlled in response to the logic level (e.g., "high" and "low") of the external input signals.

In other words, the separated up-update controllers 50 and down-update controller 60 determine levels of the external input signals to thereby generate a control signal for controlling the up-impedance update or down-impedance update. Then, the control signal is transferred to the up-terminator 31 or the down-terminator 33. When the control signal for controlling the update of up-impedance is input from the up-update controller 50, the up-terminator 31 is supplied with impedance information to thereby update impedance. When the control signal for controlling the update of down-impedance is input from the down-update controller 60, the down-terminator 33 is supplied with impedance information to thereby update impedance.

According to a preferred embodiment of the present invention, up-update control signal or down-update control signal is continuously generated in response to level of the external input signal during the hold time period.

Figure 8:
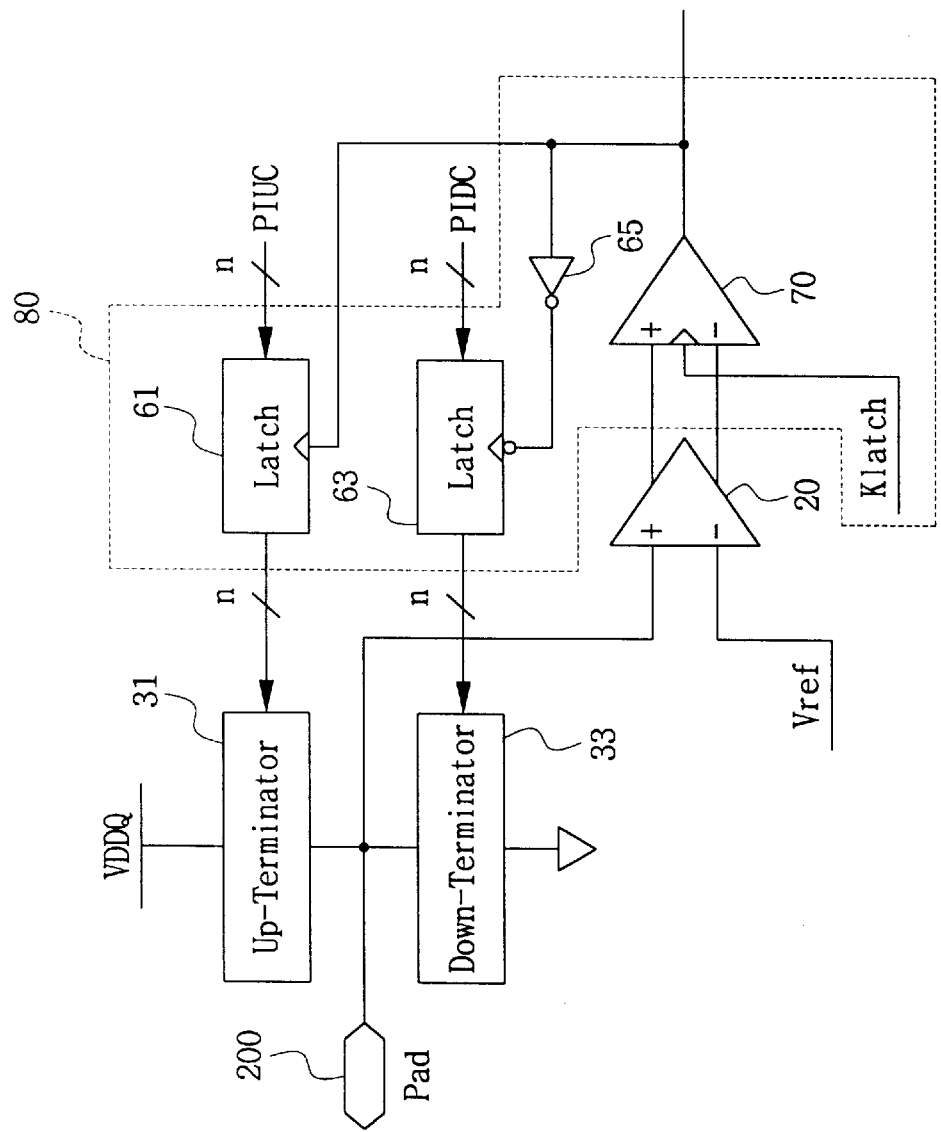
FIG. 8 is a schematic view showing an impedance updating apparatus of termination circuit in relation to separate levels of input signals according to another embodiment of the present invention.

FIG. 8 shows an impedance updating apparatus of a termination circuit in relation to separate levels of input signals according to another preferred embodiment of the present invention. Pad 200 correspond to the pad that is shown at the output of the transmitter circuit 10 shown in FIG. 5. The output of the pad is connected to the up-terminator 31, down-terminator 33, and receiver 20. The up-terminator 3 is connected to a voltage source VDDQ and the latch 61 that stores impedance information from the programmable impedance up-controller PIUC. The down-terminator 33 is also connected to the latch 63 that stores impedance information from the programmable impedance down-controller PIDC.

According to a preferred aspect of the present invention, the receiver 20 is a comparator and is connected to a reference voltage Vref. The output of the receiver 20 is connected to the input buffer 70. The output of the input buffer 70 is connected to the latch 61. The other input buffer 70 is connected to the inverter 65. The inverted signal of the output of the input buffer 70 is connected to the latch 63.

According to another preferred aspect of the invention, buffer 70 is a comparator and receives an internal clock signal Klatch. A separate update controller 80 comprises the latch 61, the latch 63 and an input buffer 70.

The impedance update apparatus of termination circuit with level of input signals in FIG. 8 operates as follows. The updated impedance information at a predetermined cycle is sent to programmable impedance up-controller PIUC or programmable impedance down-controller PIDC, and the updated information is stored in the latch 61 or the latch 63, respectively. An external input signal that is input through the pad passes through the receiver 20. The external input signal is held in response to the internal clock signal Klatch in the input buffer 70. And then, the external input signal is input to the latch 61 and latch 63 according to a level (up or down) of the external input signal. The impedance information stored in the latch 61 or the latch 63 is transmitted to the up-terminator 31 or the down-terminator 33 in accordance with the input pattern, thereby updating the impedance.

In such a way, the up-update control signal or down-update control signal is continuously generated in response to the external input signal every hold time during which an internal clock signal can appear and accordingly the up-update or down-update of impedance is separately controlled, thereby preventing the signal distortion.

In other words, the separate update controller 80 determines levels of the external input signals to thereby generate a control signal that controls the up-impedance update or down-impedance update of a termination circuit in which minimum current flows, and transfer the control signal to the up-terminator 31 or down-terminator 33. When the control signal for controlling the up-impedance update is input from the separate update controller 80, the up-terminator 31 is supplied with impedance information to thereby update impedance. When the control signal for controlling the update of down impedance is input from the separate update controller 80, the down-terminator 33 is supplied with impedance information to thereby update impedance.

According to a preferred embodiment of the present invention, up-update or down-update control signal is continuously generated only when up-update enable signal or down-update enable signal, which is periodically generated, corresponds to a level of an external input signal in its predetermined condition.

Figure 9:
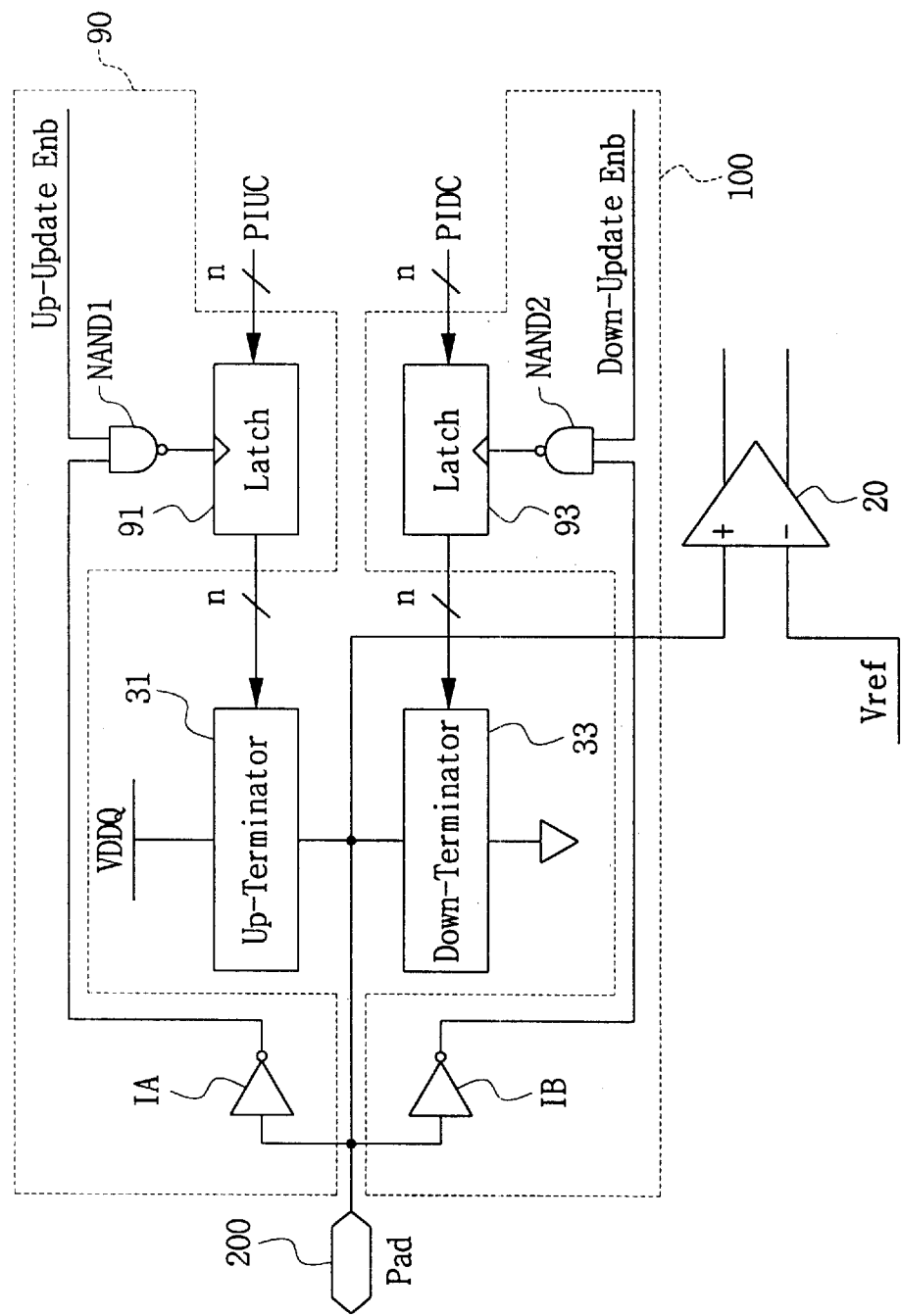
FIG. 9 is a schematic view showing an impedance updating apparatus of termination circuit in relation to an external signal according to a still another embodiment of the present invention.

FIG. 9 shows an impedance updating apparatus of termination circuit in accordance with an external signal according to another embodiment of the present invention.

Pad 200 corresponds to the pad 100 that is shown at the output of the transmitter circuit 10 shown in FIG. 5. The output of the pad is connected to the up-terminator 31, the down-terminator 33, the receiver 20, the inverter IA, and the inverter IB. The up-terminator 31 is connected to the voltage source VDDQ and is connected to the latch 91 that stores impedance information from the programmable impedance up-controller PIUC. The down-terminator 33 is also connected to the latch 93 that stores impedance information from the programmable impedance down-controller PIDC. The inverters IA and IB are connected to the NAND gates NAND1 and NAND2, respectively. The other input of the NAND gate NAND1 is connected to the up-update enable signal and the output of the NAND gate NAND1 is connected to the latch 91. The other input of the NAND gate NAND2 is connected to the down-update enable signal and the output of the NAND gate NAND2 is connected to the latch 93.

According to a preferred aspect of the present invention, the receiver 20 is a comparator and is connected to a reference voltage Vref. An up-update controller 90 includes the inverter IA, the NAND gate NAND1 and the latch 91. A down-update controller 100 includes the inverter IB, NAND gate NAND2, and the latch 93.

The impedance update apparatus of termination circuit according to the external input signal, up-update enable signal, and down-update enable signal, as shown in FIG. 9, is made by compensating the impedance update apparatus of termination circuit as shown in FIG. 6 in which updating should be continuously performed in response to an external input signal. The apparatus generates the up-update enable signal and the down-update enable signal at a predetermined interval time in a chip to perform updating only when the generated signals are to be NAND with a level of an external signal, thereby reducing the system load. In other words, the up-update controller 90 and down-update controller 100 determines level of the external input signal to thereafter generate a control signal for controlling the up-impedance update or down-impedance update and transfer the generated signal to the up-terminator 31 or down-terminator 33. The up-terminator 31 is provided with impedance information from the control signal for controlling the up-impedance update that is output from the up-update controller 90, thereby performing impedance update. The down-terminator 33 is provided with impedance information from the control signal for controlling the down-impedance update that is output from the down-update controller 100, thereby performing impedance update.

Figure 10:
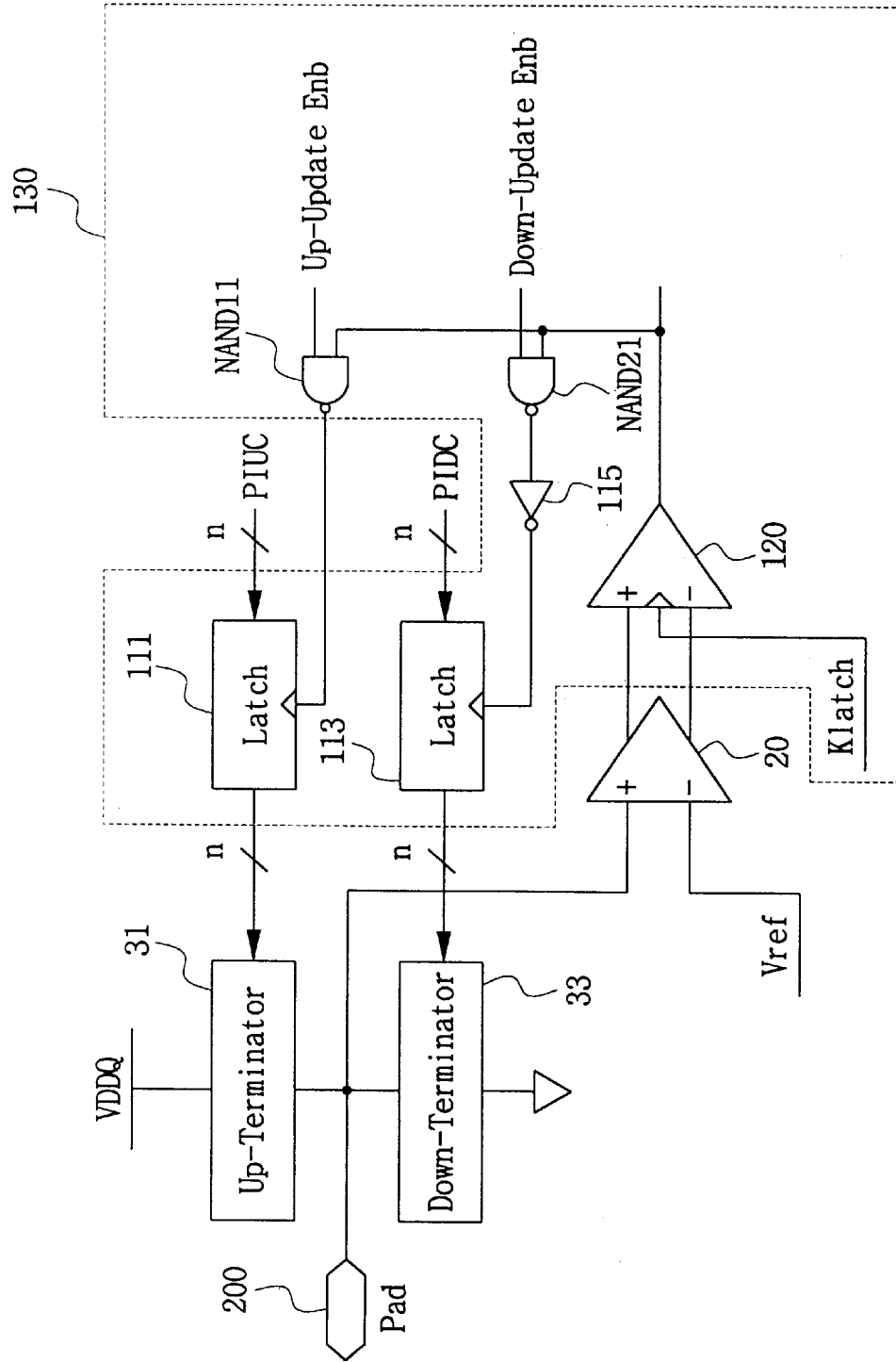
FIG. 10 is a schematic view showing an impedance updating apparatus of termination circuit in relation to an external signal according to a another embodiment of the present invention.

Referring to FIG. 10, which shows an impedance update apparatus of termination circuit that is operated in accordance with an external signal, according to the another embodiment of the present invention.

The circuit diagram illustrates the impedance update apparatus of termination circuit that is operated in response to an external input signal and an enable signal that are periodically generated every hold time.

Pad 200 corresponds to the pad shown 100 in the output of the transmitter circuit 10 shown in FIG. 5. The output of the pad is connected to the up-terminator 31, down-terminator 33, and receiver 20. The up-terminator 31 is connected to the latch 111 that stores impedance information from the programmable impedance up-controller PIUC. The down-terminator 33 is also connected to the latch 113 that stores impedance information from the programmable impedance down-controller PIDC.

According to a preferred aspect of the present invention, the receiver 20 is a comparator and is connected to a reference voltage Vref. The output of the receiver 20 is connected to the input buffer 120 and is connected to a internal clock signal Klatch. The output of the input buffer 120 is connected to the input of the NAND gate NAND11 and NAND gate NAND21. The other input of the NAND gate NAND11 is connected to the up-update enable signal and the output of the NAND gate NAND11 is connected to the latch 111. The other input of the NAND gate NAND21 is connected to the down-update enable signal, the output of the NAND gate NAND21 is connected to the inverter 115, and the output of the inverter 115 is connected to the latch 113. Here, the update controller 130 comprises the latch 111, latch 113, NAND11, NAND21, inverter 115 and input buffer 120. The inverter 115 and NAND gate NAND21 can be substituted to an AND gate.

The operation of the impedance update apparatus of termination circuit that is operated in response to an external signal, as shown in FIG. 10, is also similar to the impedance update apparatus of termination as shown in FIG. 9.

The apparatus generates the up-update enable signal and the down-update enable signal at a predetermined interval of time in a chip to perform updating only when the generated signals are NANDed or ANDed with a level of an external signal, thereby controlling separately the up-impedance update and down-impedance update and reducing the system load. In other words, the update controller 130 detects level of the external input signal to thereafter generate a control signal for controlling the up-impedance update or down-impedance update and transfer the generated signal to the up-terminator 31 or down-terminator 33. The up-terminator 31 is provided with impedance information from the control signal for controlling the up-impedance update that is output from the update controller 130, thereby performing updating of impedance. The down-terminator 33 is provided with impedance information from the control signal for controlling the down-impedance update that is output from the update controller 130, thereby performing updating of impedance.

The aforementioned preferred embodiments of the present invention is designed in such a manner that the termination circuit is divided into the up-terminator and the down-terminator, impedance of the terminator in which minimum current flows among the up-terminator and down-terminator is updated in response to an external input signal. Accordingly, the impedance update of the up-terminator and down-terminator is separately controlled.

As an example other than the aforementioned embodiments of the present invention, a current comparator can be connected to each of the up-terminator and down-terminator to thereby detect a terminator in which minimum current flows among the terminators, thereby performing impedance update of each of the up and down terminators. The detailed structure of such a circuit is omitted.

According to the present invention, there is an advantage that the impedance update of the terminator can separately be controlled to reduce occurrence of the system noises. In addition, while the impedance update of the terminator is separately controlled in each of the up-terminator and down-terminator, the impedance update can be performed only periodically or only during a predetermined time such as set time or hold time, thereby minimizing occurrence of the system noises.

Although the present invention has been described herein with reference to the accompany drawings, it is to be understood that the present invention is not limited to those precise embodiments, and various other changes and modifications may be affected therein by one skilled in the art without departing from the scope or sprit of the present invention. All such changes and modifications are intended to be included within the scope of the invention as defined by the appended claims.

What is claimed is:

1. An impedance updating apparatus, comprising:
   a terminator circuit for receiving and terminating an external input signal, the terminator circuit having an up-terminator and a down-terminator;
   a first update controller receiving the external input signal, the first update controller including a first latch to store first impedance information from a programmable impedance up-controller and control the up-terminator based on the level of the external input signal; and
   a second update controller receiving the external input signal, the second update controller including a second latch to store second impedance information from a programmable impedance down-controller and control the down-terminator based on the level of the external input signal.

2. The apparatus as claimed in claim 1, wherein the first update controller and the second update controller perform impedance updating of the up-terminator and down-terminator, respectively, when an up-update enable signal and a down-update enable signal and a level of the external input signal correspond to a predetermined condition.

3. The apparatus as claimed in claim 1, wherein the first update controller and the second update controller perform impedance updating of the up-terminator and down-terminator, respectively, in response to a level of the external input signal during set-up or hold time only.

4. The apparatus as claimed in claim 1, wherein the first update controller further comprises a first inverter receiving the external input signal and outputting the inverted external signal to the first latch.

5. The apparatus as claimed in claim 1, wherein the second update controller further comprises a second inverter receiving the external input signal and outputting the inverted external signal to the second latch.

6. An impedance updating, termination circuit, comprising:
   separate update controllers having a first inverter and a second inverter receiving an external input signal, a first latch connected to an output of the first inverter to store impedance information from a programmable impedance up controller, and a second latch connected to an output of the second inverter to store impedance information from a programmable impedance down controller,
   wherein the separate controller output an impedance update control signal of an up-terminator when the external input signal is a logic "high", and output an impedance update control signal of an down-terminator when the external input signal is a logic "low"; and
   a terminator circuit having an up-terminator and a down-terminator connected to a common external input signal,
   wherein the terminator circuit receives impedance information from the first latch to update impedance of the up-terminator when a control signal for controlling an impedance update of the up-terminator is input from the separate update controller, and receives impedance information from the second latch to update impedance of the down-terminator when a control signal for controlling an impedance update of the down-terminator is input from the separate update controller.

7. The circuit as claimed in claim 6, wherein the separate update controller further comprises:
   a first NAND gate which receives at a first input the output of the first inverter and at a second input an up-update enable signal, the output of the first NAND gate being connected to the first latch; and
   a second NAND gate which receives at a first input the output of the second inverter and at a second input an up-update enable signal, the output of the second NAND gate being connected to the second latch,
   wherein the update controller generates a control signal for controlling up-update or down-update only when the level of the external input signal and the up-update enable signal or down-update enable signal are NANDed.

8. An impedance updating termination circuit, comprising:
   a receiver circuit to receive an external input signal;
   a separate update controller having: an inverter connected to a second latch at its output; an input buffer connected to an output of the receiver circuit at its input and to an internal clock signal determining set-up time or hold time, and the output of the buffer connected to a first latch at its output and connected to the inverter at its output; the first latch for storing impedance information from a programmable impedance up controller; and the second latch for storing impedance information from a programmable impedance down controller, wherein the separate controller generates an up-update or down-update control signal in response to an up level or down level of an external input signal that passed through the receiver circuit to thereby control separately an up-update or down-update of impedance; and
   a terminator circuit having an up-terminator and a down-terminator connected to a common external input signal from the transmitter circuit, wherein the terminator circuit receives impedance information from the first latch to update impedance of the up-terminator when a control signal for controlling an impedance update of the up-terminator is input from the separate update controller, and receives impedance information from the second latch to update impedance of the down-terminator when a control signal for controlling an impedance update of the down-terminator is input from the separate update controller.

9. The circuit as claimed in claim 8, wherein the separate update controller further comprises:
   a first NAND gate connected to the output of the input buffer at its input and to an up-update enable signal that is periodically generated at its other input and connected to the first latch at its output; and
   a second NAND gate connected to the output of the input buffer at its input and an down-update enable signal being generated periodically at its other input and connected to the inverter at its output,
   wherein the update controller generates a control signal for controlling up-update or down-update when the level of the external input signal and the up-update enable signal or down-update enable signal are NANDed or ANDed.

10. An impedance updating method of a termination circuit having up/down terminators and separate update controllers for detecting terminator through which minimum current flows in response to level of an external input signal, comprising the steps of:
    determining signal levels of the external input signal to thereby detect a terminator through which minimum current flows between the up- or down-terminator;
    separately storing first stored impedance information and second stored impedance information; and impedance updating the detected terminator through which minimum current flows in accordance with the separately stored first and second impedance information.

11. The method as claimed in claim 10, wherein the step of determining is performed during set-up time or hold time.

12. The method as claimed in claim 10, wherein the step of determining is performed when a periodic update enable signal is present.

13. The method as claimed in claim 10 wherein if the detected terminator is the up-terminator, the step of impedance updating is performed by a first stored impedance information, and if the detected terminator is the down-terminator, the step of impedance updating is performed by a second stored impedance information.

14. The method as claimed in claim 10, wherein if the detected terminator is the up-terminator, the step of impedance updating is performed by a latch based on the level of the external input signal, and if the detected terminator is the down-terminator, the step of impedance updating is performed by a second latch based on the level of the external input signal.

* * * * *